United States Patent

Suzuki

[11] Patent Number: 5,187,516
[45] Date of Patent: Feb. 16, 1993

[54] DEVICE FOR INDICATING DISTANCE MEASURING ZONE OF CAMERA

[75] Inventor: Nobuharu Suzuki, Gamagohri, Japan

[73] Assignee: Asahi Kogaku Kogyo Kabushiki Kaisha, Tokyo, Japan

[21] Appl. No.: 919,386

[22] Filed: Jul. 29, 1992

Related U.S. Application Data

[63] Continuation of Ser. No. 599,080, Oct. 17, 1990, abandoned.

[30] Foreign Application Priority Data

Oct. 20, 1989 [JP] Japan .................. 1-273432

[51] Int. Cl.⁵ .............................. G03B 13/36
[52] U.S. Cl. .......................... 354/403; 250/201.4; 250/203.2
[58] Field of Search .............. 354/403, 139; 356/152; 250/201.4, 203.2

[56] References Cited

U.S. PATENT DOCUMENTS

| | | | |
|---|---|---|---|
| 3,614,439 | 10/1971 | Beelik et al. | 356/152 |
| 3,752,587 | 8/1973 | Myers et al. | 356/152 |
| 4,067,030 | 1/1978 | Kuramoto et al. | 354/139 |
| 4,386,848 | 6/1983 | Clendenin et al. | 356/152 |

Primary Examiner—Russell E. Adams
Attorney, Agent, or Firm—Sandler Greenblum & Bernstein

[57] ABSTRACT

A device for indicating a distance measuring zone, which device includes a CCD image pickup device and an electronic finder. The CCD image pickup device is sensitive to an infrared distance measuring beam which is projected by a distance measuring device onto an object and reflected therefrom. The electronic finder is provided for observing an electric conversion image formed by the CCD image pickup device.

9 Claims, 3 Drawing Sheets

DEVICE FOR INDICATING DISTANCE MEASURING ZONE OF CAMERA

This application is a continuation of application Ser. No. 07/599,080, filed Oct. 17, 1990, now abandoned.

BACKGROUND OF THE INVENTION

1. Field of the Invention

The present invention relates to a device for confirming the zone in which a distance measurement is performed when focusing a camera.

2. Description of the Related Art

In a camera having an active type distance measuring device which projects an infrared distance measuring beam onto an object, a distance measuring mark, indicating the zone in which a distance measuring beam is projected, is provided in a view finder. The spot size of the distance measuring beam, however, is smaller than the zone shown by the distance measuring mark. Therefore, the photographer cannot determine at which portion of the object the distance is measured. Thus the camera may not be focused on the point desired by the photographer.

In particular, in a zoom lens camera, due not only to the distance between the camera and an object, but also to the change of focal length of the camera, a change must occur in the position of the distance measuring beam spot within the distance measuring mark. Therefore, the possibility of an error in the distance measured is larger than in an usual (i.e. fixed focus) camera.

SUMMARY OF THE INVENTION

Therefore, an object of the present invention is, in a camera having an active type distance measuring device projecting an infrared distance measuring beam, to provide a camera by which the position of the infrared distance measured beam can be exactly measured.

According to the present invention, there is provided a device comprising a sensing mechanism, for sensing an infrared distance measuring beam, to thereby form an electric conversion image, and an observing mechanism for observing the formed electric conversion image.

Further, according to the present invention, there is provided a camera comprising a view finder which includes a CCD (charge coupled device) image pickup device sensitive to an infrared distance measuring beam, and an electronic finder for observing an electric conversion image formed by the CCD image pickup device.

Still further, according to the present invention, there is provided a device comprising an projecting mechanism for projecting an infrared beam onto an object and measuring the object distance based on an infrared beam reflected from the object, a sensing mechanism for sensing the reflected infrared beam and converting the amount of beam sensed to the amount of electric charge, to thereby form an electric conversion image, and an observing mechanism for observing the formed electric conversion image.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENT

Figure 1:
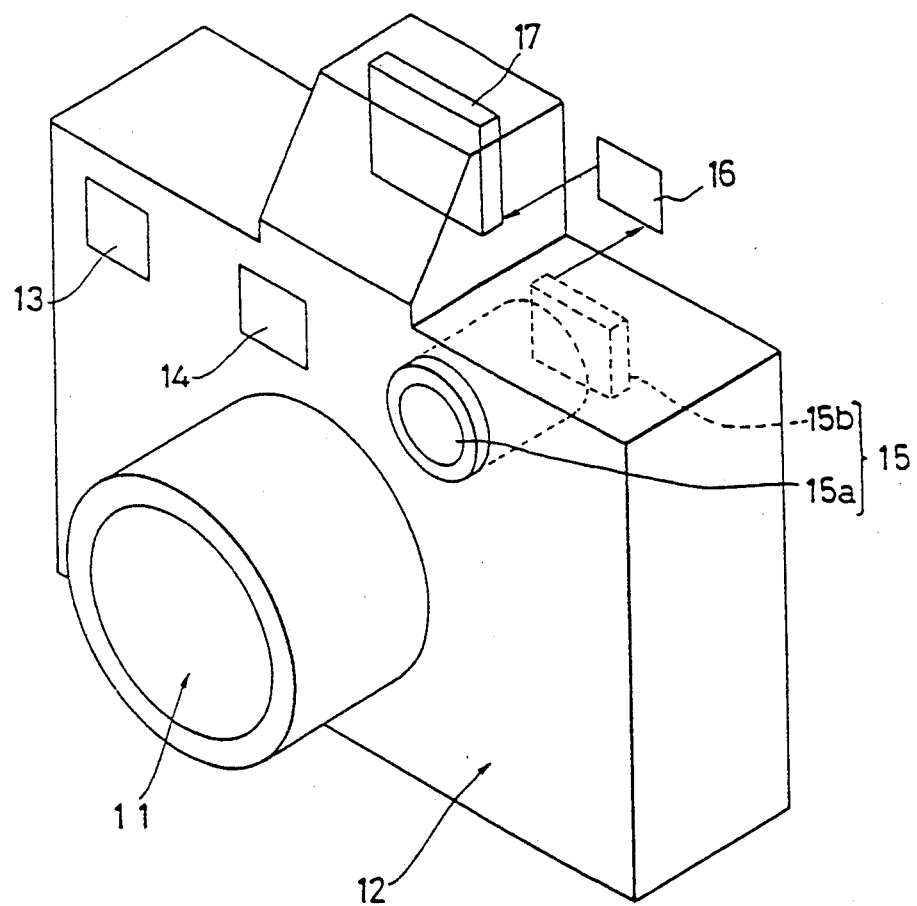
FIG. 1 is a perspective view showing a device for indicating a distance measuring zone of an embodiment of the present invention.
Figure 2:
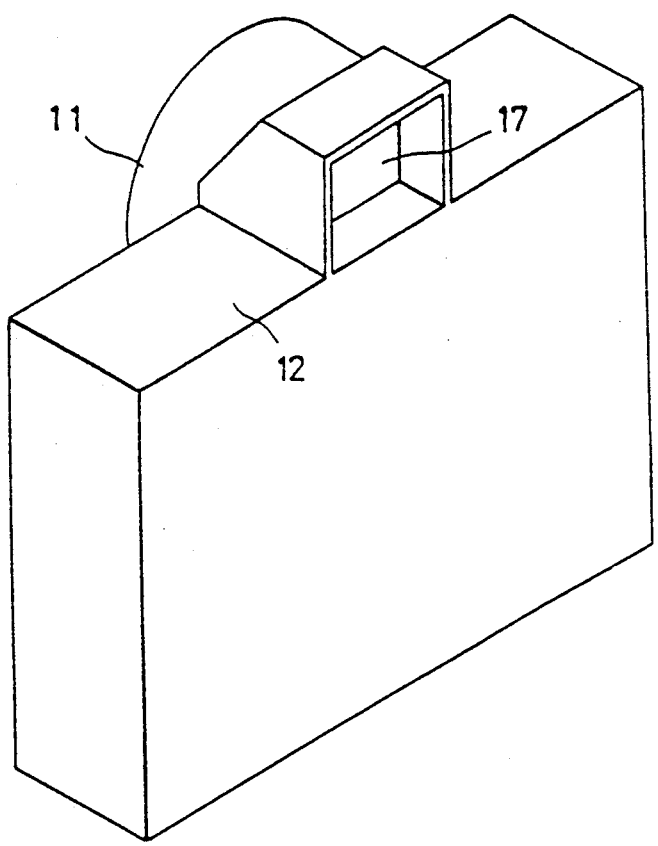
FIG. 2 is a perspective view of the device shown in FIG. 1, when viewed from the back thereof.

The present invention will now be described with reference to the embodiment shown in the drawings. FIGS. 1 and 2 show a still camera to which the present invention is applied, wherein a camera body 12 is provided with a taking lens 11 and a well known active type distance measuring device having an emitting part 13 and a receiving part 14. The emitting part 13 projects an infrared distance measuring beam (IRED) onto an object, and the receiving part 14 receives the distance measuring beam reflected from the object, whereby the object distance is measured based on the output of the receiving part 14, and thereafter, a focusing lens of the taking lens 11 is moved to an in-focus position corresponding to the measured object distance.

In this embodiment, a view finder is constructed by a CCD image pickup device 15 and an electronic finder 17; the CCD image pickup device 15 is disposed beside the taking lens 11, and the electronic finder 17 is disposed on a back and upper portion of the camera body 12. The CCD image pickup device 15 is constructed in such a manner that an object image is inputted to a CCD (charge coupled device) 15b through a finder lens 15a, the CCD 15b senses a reflected infrared beam and converts the amount of the beam sensed to an amount of electric charge to thereby form an electric conversion image. The object image obtained by the photoelectric conversion by the CCD 15b is sent to the electronic finder 17 through a control device 16, and can be observed in the electronic finder 17.

The CCD image pickup device 15 described above is sensitive to an infrared distance measuring beam. Namely, although the CCD image pickup device 15 is usually provided with an infrared filter to block out infrared rays, in this embodiment the infrared filter is omitted, and thus the CCD image pickup device 15 is sensitive to the infrared distance measuring beam.

In a camera having the above-described construction, when a shutter button is pushed half way down, an infrared distance measuring beam is projected from the emitting part 13, and the spot of this infrared distance measuring beam can be observed in the electronic finder 17 through the CCD image pickup device 15 and the control device 16.

Figure 3:
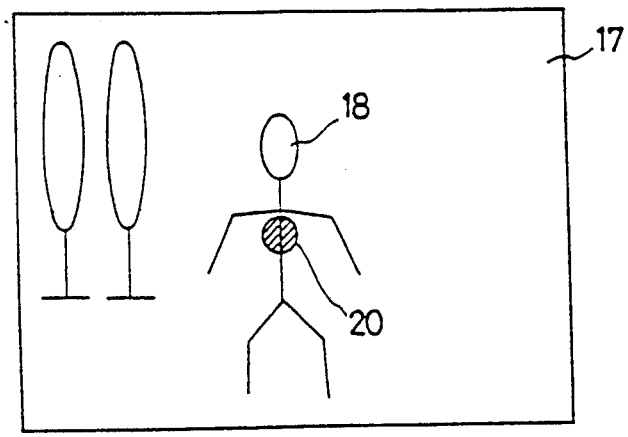
FIG. 3 is a schematic view showing an example of a state of an infrared distance measuring beam when observed in an electronic finder.

FIG. 3 shows the object to be photographed, and the spot of the infrared distance measuring beam, as seen in the finder 17. As shown in the Figure, because the CCD image pickup device 15 is sensitive to an infrared beam, a spot 20 of the infrared distance measuring beam projected onto the object 18 can be observed through the electronic finder 17. Therefore, after confirming that the infrared beam is exactly projected onto the object 18, the photographer pushes the shutter button all the way down, and thus a sharply focused picture of the object 18 can be obtained. Note, an usual film (a silver halide film) or a charge coupled device on which an object is formed through the taking lens 11, are not sensitive to the spot 20 of the infrared distance measuring beam, and thus the spot 20 of the infrared distance measuring beam is not recorded on the taken (or photographed) still picture or video.

In the above embodiment, although the electronic finder 17 is provided on the back and upper portion of the camera body 12, as is usual with most cameras, the finder 17 can be provided on any portion of the camera body 12, or can be provided separately from the camera body 12 and connected to the camera body 12 through a cable. Further, any type of electronic finder including a liquid crystal view finder and an electronic view finder can be adapted for the electric finder 17, as long as the electric conversion image formed by the CCD 15b can be displayed therein.

Although the present invention is applied to a still camera in the above embodiment, it also can be applied to a video movie camera. Namely, although a focus state is usually always indicated in an electronic view finder of a video movie camera, and thus there is little need for a distance measurement zone, the present invention can be applied to a video movie camera provided with an active type distance measuring device.

Although the embodiments of the present invention have been described herein with reference to the accompanying drawings, obviously many modifications and changes may be made by those skilled in this art without departing from the scope of the invention.

I claim:

1. A device for indicating a distance measuring zone of a camera having a distance measuring device for projecting an infrared distance measuring beam onto an object and measuring an object distance based on an infrared beam reflected from the object, said infrared distance measuring beam forming a spot on the object, said device comprising:
   means for sensing the infrared distance measuring beam reflected from the object and forming an electric conversion image;
   means for observing the formed electric conversion image, said means for observing being sensitive to said infrared distance measuring beam, wherein the observed electric conversion image includes the spot and the object; and
   imaging means for recording the formed electric conversion image, said imaging means not being sensitive to said infrared distance measuring beam, wherein said infrared distance measuring beam is not recorded on said imaging means.

2. A device according to claim 1, wherein said sensing means is a CCD image pickup device which is sensitive to the infrared distance measuring beam.

3. A device according to claim 1, wherein said observing means is an electronic view finder.

4. A device according to claim 1, wherein said observing means is a liquid crystal view finder.

5. A device according to claim 1, wherein said observing means is disposed on a back and an upper portion of said camera.

6. A device according to claim 1, wherein said camera is a still camera.

7. A device according to claim 1, wherein said camera is a video movie camera.

8. In a camera having a distance measuring device which projects an infrared distance measuring beam onto an object and measures an object distance based on an infrared beam reflected from the object, said infrared distance measuring beam forming a spot on the object, said camera comprising a view finder which includes a CCD image pickup device sensitive to an infrared distance measuring beam reflected from the object, an electronic finder for observing an electric conversion image formed by said CCD image pickup device, the observed electric conversion image including the spot and the object, and imaging means for recording the formed electric conversion image, said imaging means not being sensitive to said infrared distance measuring beam, wherein said infrared distance measuring beam is not recorded on said imaging means.

9. A device for measuring a distance between a camera and an object, said device comprising:
   means for projecting an infrared beam onto the object and measuring the object distance based on an infrared beam reflected from the object, said infrared beam forming a spot on the object;
   means for sensing the infrared beam reflected from the object and converting the amount of beam sensed to the amount of electric charge, to thereby form an electric conversion image;
   means for observing the formed electric conversion image, said means for observing being sensitive to said infrared distance measuring beam, wherein the observed electric conversion image includes the spot and the object; and
   imaging means for recording the formed electric conversion image, said imaging means not being sensitive to said infrared distance measuring beam, wherein said infrared distance measuring beam is not recorded on said imaging means.

* * * * *